US008554178B1

(12) United States Patent
Swaminathan et al.

(10) Patent No.: US 8,554,178 B1
(45) Date of Patent: Oct. 8, 2013

(54) METHODS AND SYSTEMS FOR EFFICIENT DEPLOYMENT OF COMMUNICATION FILTERS

(75) Inventors: Ramkumar Swaminathan, Olathe, KS (US); Chidambaram Pavanasam, Overland Park, KS (US); Kenton Shuck, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 622 days.

(21) Appl. No.: 12/507,445

(22) Filed: Jul. 22, 2009

(51) Int. Cl.
*H04K 1/00* (2006.01)
*H04M 1/66* (2006.01)
*H04M 1/68* (2006.01)
*H04M 3/16* (2006.01)
*H04W 4/00* (2009.01)
*H04W 40/00* (2009.01)

(52) U.S. Cl.
USPC ..... 455/411; 380/248; 455/432.1; 455/432.3; 455/448

(58) Field of Classification Search
USPC ............ 455/411, 432.1, 448, 432.3; 380/248
See application file for complete search history.

(56) References Cited

U.S. PATENT DOCUMENTS

| 6,055,236 | A | 4/2000 | Nessett et al. |
|---|---|---|---|
| 6,697,354 | B1 | 2/2004 | Borella et al. |
| 6,816,912 | B1 | 11/2004 | Borella et al. |
| 6,829,473 | B2 | 12/2004 | Raman et al. |
| 6,956,846 | B2 | 10/2005 | Lewis et al. |
| 6,973,309 | B1 | 12/2005 | Rygula et al. |
| 6,993,039 | B2 | 1/2006 | Borella |
| 7,028,335 | B1 | 4/2006 | Borella et al. |
| 7,031,275 | B1 | 4/2006 | Borella et al. |

(Continued)

OTHER PUBLICATIONS

Congdon et. al. "Radius Filter Rule Attribute," RFC 4849, Apr. 2007.*

(Continued)

*Primary Examiner* — Vladimir Magloire
*Assistant Examiner* — Edd Rianne Plata

(57) ABSTRACT

Methods and systems for efficient deployment of communication filters are presented. In an exemplary embodiment, a wireless communication device (WCD) attempts to register with a foreign agent and a home agent by using mobile IP. During this process, an authentication, authorization, and accounting (AAA) server receives a first message from the foreign agent, where the first message seeks to authenticate the WCD. The AAA server responds to the first message with a second message containing a filter to be applied to the WCD's communication. The AAA server than receives a third message containing the filter, and the AAA server responsively transmits a fourth message to the home agent, seeking to have the home agent apply the filter to the WCD's communication. In this way, communications between the home agent and the AAA server can be reduced because the home agent only communicates with the AAA server if the WCD is subject to a filter.

14 Claims, 6 Drawing Sheets

(56) References Cited

U.S. PATENT DOCUMENTS

| | | | |
|---|---|---|---|
| 7,032,242 | B1 | 4/2006 | Grabelsky et al. |
| 7,080,151 | B1 | 7/2006 | Borella et al. |
| 7,082,130 | B2 | 7/2006 | Borella et al. |
| 7,099,650 | B2 | 8/2006 | Akgun et al. |
| 7,130,625 | B2 | 10/2006 | Akgun et al. |
| 7,146,152 | B2 | 12/2006 | Akgun et al. |
| 7,154,868 | B1 | 12/2006 | Sharma et al. |
| 7,218,609 | B2 | 5/2007 | Borella et al. |
| 7,280,546 | B1 | 10/2007 | Sharma et al. |
| 7,286,512 | B1 | 10/2007 | Borella |
| 7,295,511 | B2 | 11/2007 | Sharma et al. |
| 7,305,429 | B2 | 12/2007 | Borella |
| 7,324,499 | B1 | 1/2008 | Borella et al. |
| 7,330,453 | B1 | 2/2008 | Borella et al. |
| 7,346,684 | B2 | 3/2008 | Borella |
| 7,366,509 | B2 | 4/2008 | Akgun et al. |
| 7,426,188 | B2 | 9/2008 | Borella |
| 2004/0192306 | A1* | 9/2004 | Elkarat et al. .............. 455/435.2 |
| 2006/0003765 | A1* | 1/2006 | Patil et al. .................. 455/432.1 |
| 2009/0070248 | A1* | 3/2009 | Ge et al. .......................... 705/35 |

OTHER PUBLICATIONS

Larsson et. al (A Filter Rule Mechanism for Multi-access Mobile IPv6, Jun. 19, 2006).*

Funk Software, Inc., Session Termination and Hotlining Services for CDMA Operators—Using Funk Software's Steel-Belted Radius®/Session Control Server, Dec. 2005.

Radiator® Radius Server, Open System Consultants Pty. Ltd., Installation and Reference Manual for Radiator Version 4.4, Mar. 11, 2009.

M. Chiba et al., "Dynamic Authorization Extensions to Remote Authentication Dial in User Service (RADIUS)," Network Working Group, RFC 3576, Jul. 2003.

Johnson, D. et al., "Mobility Support in IPv6," Network Working Group, Request for Comments: 3775, Category: Standards Track, pp. 1-165 (Jun. 2004).

* cited by examiner

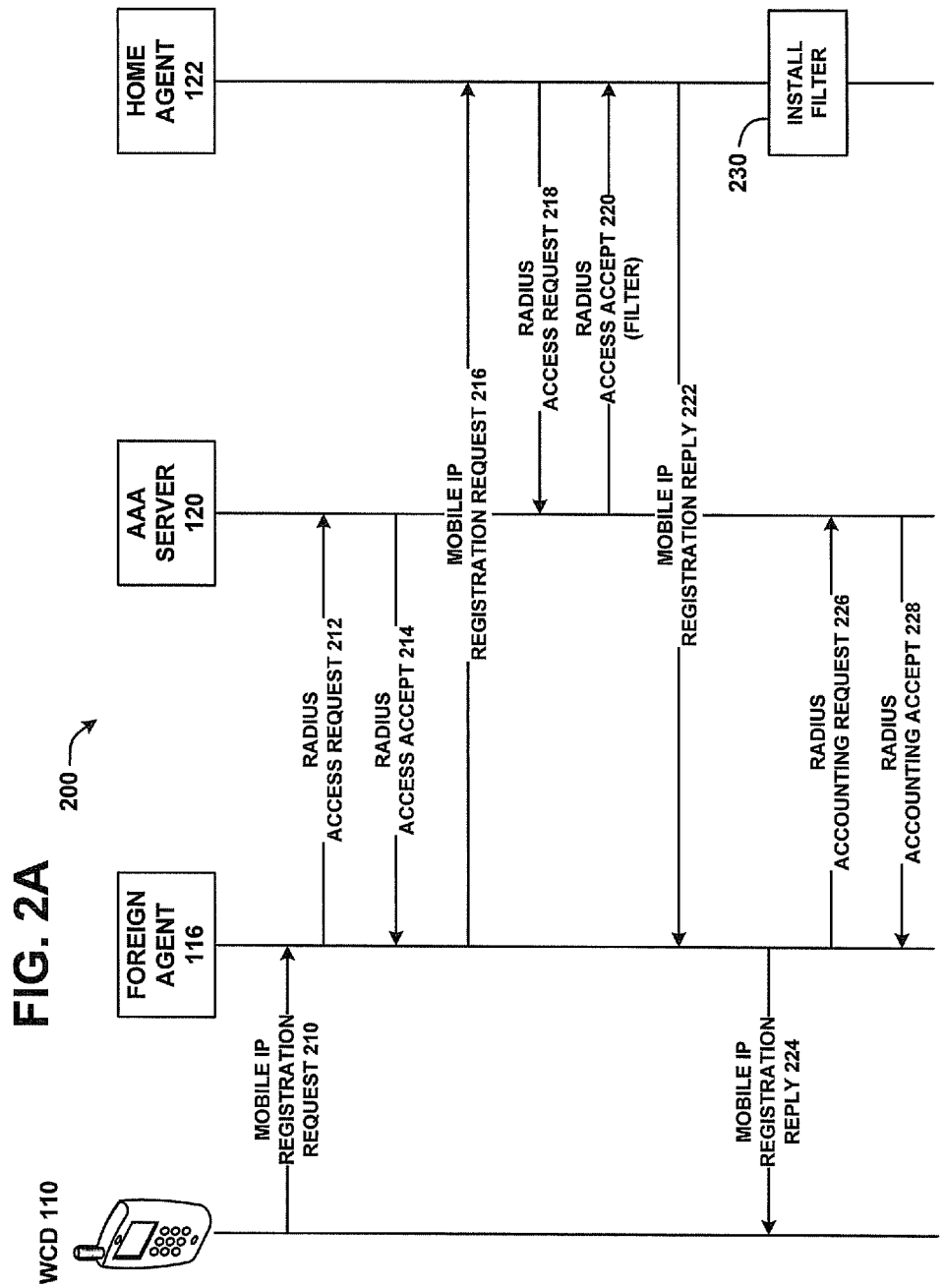

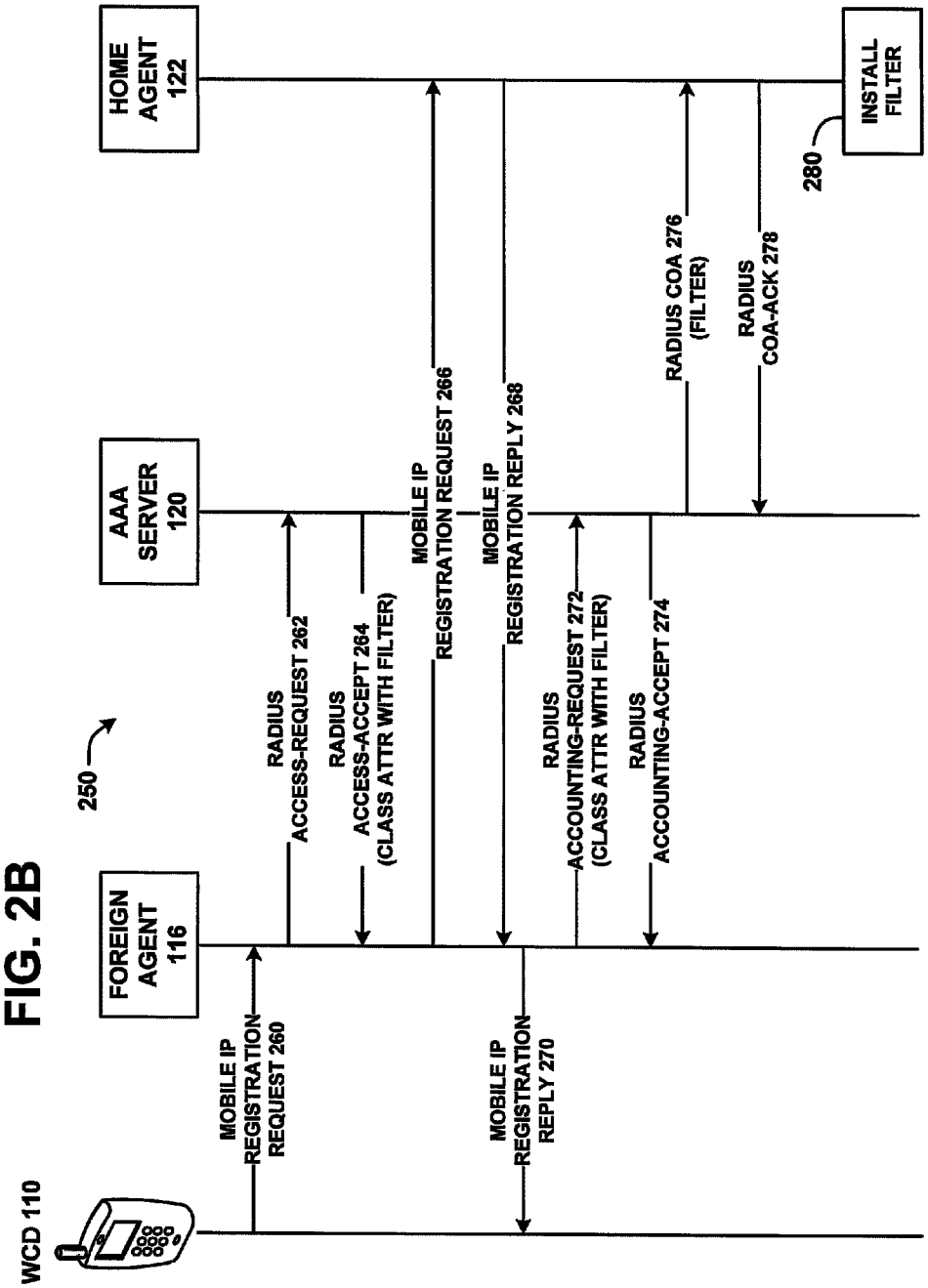

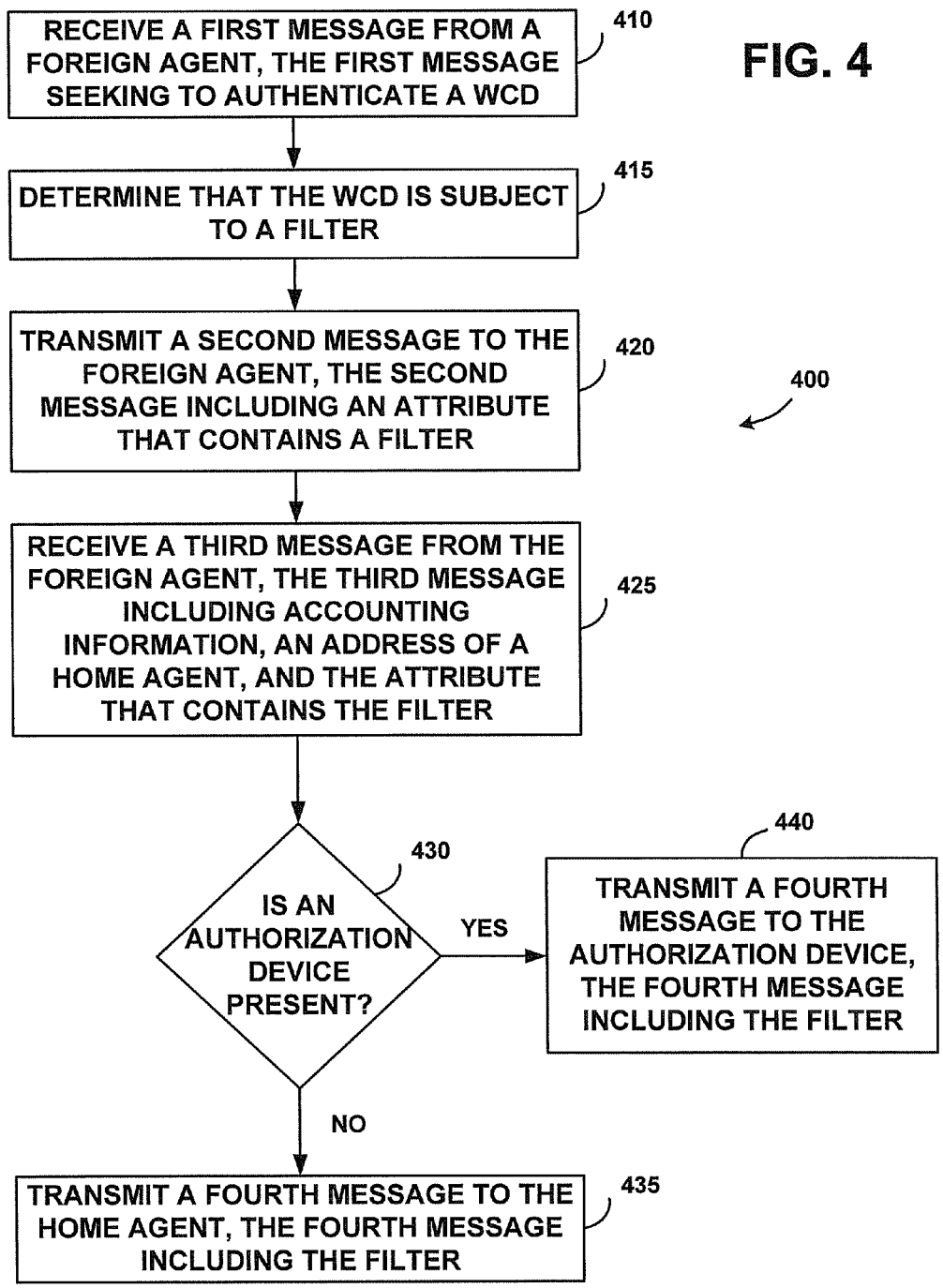

METHODS AND SYSTEMS FOR EFFICIENT DEPLOYMENT OF COMMUNICATION FILTERS

BACKGROUND

Many modern wireless communication systems are logically divided into a bearer plane and a control plane. The bearer plane may transport bearer traffic. Examples of bearer traffic include voice and/or data communication originating from or heading to a wireless communication device (WCD), such as a mobile phone. The control plane may transport control traffic on behalf of the WCD. This control traffic may facilitate the establishment, maintenance, and tear down of the WCD's bearer sessions. Accordingly, the control plane may include one or more nodes acting as policy decision points. These nodes may transmit, receive, or manipulate control traffic on behalf of the WCD.

One role that these policy decision points may take on is to determine when and how to insert a filter into the WCD's bearer path. Filters may serve many different functions, including, but not limited to, allowing the WCD to communicate with certain correspondent nodes, preventing the WCD from communicating with other correspondent nodes, controlling which applications a WCD may use, redirecting some or all of the WCD's communication to a particular correspondent node, or applying a quality of service (QOS) treatment to the WCD's communication. It may be advantageous to insert a particular filter into a particular node in the WCD's bearer path in cases where this particular node may be best equipped to apply the filter in an efficient fashion.

One challenge in deploying wireless communication networks is to support handoffs of WCDs from one wireless coverage area to another wireless coverage area. The mobile Internet Protocol has been developed to support handoffs between wireless coverage areas, for data communication sessions involving the Internet Protocol (IP). Mobile IP involves a WCD registering with a foreign agent and a home agent during its initial access to the wireless communication network, and during at least some handoffs. Foreign agents may be associated with certain wireless coverage areas or groups of wireless coverage areas, while home agents may anchor the WCD's mobile IP session. Thus, when a WCD is handed off from one wireless coverage area to another, the WCD may register with a different foreign agent, but preferably maintains its registration with the same home agent. Accordingly, all of the WCD's communication may pass through the home agent. Consequently, even as the WCD is handed off between wireless coverage areas (and thus between foreign agents as well), the home agent can apply a consistent policy to the WCD's communication.

Therefore, it may be advantageous to deploy a filter for a WCD into the WCD's home agent. To do so, some proposals have involved the home agent accessing an authentication, authorization, and accounting (AAA) server during the WCD's mobile IP registration process to (i) authenticate the WCD, and (ii) acquire any filter to be applied to the WCD's communication. However, prior to the home agent becoming involved in the WCD's mobile IP registration process, a foreign agent may have already authenticated the WCD. Additionally, a wireless service provider may support a large number (e.g., tens of millions) of WCDs, but only a small fraction of these WCDs may be subject to filtering.

Overview

In order to efficiently deploy one or more filters to a home agent, a policy decision point may determine when and how to transmit a filter associated with a given WCD to a home agent. In particular, an AAA server, acting as a policy decision point, may proactively transmit the filter once the AAA server has determined, via a message received from a foreign agent, that the WCD has successfully registered with the home agent. In this way, a second authentication of each WCD by the home agent may be avoided, since the authentication task may have been already accomplished at the foreign agent.

Furthermore, AAA and home agent resources may be conserved when relatively few WCD's are actually subject to filtering. For example, the wireless service provider may grant unrestricted Internet access the WCDs of subscribers whose bills are fully paid, but limit the WCDs of subscribers whose bill payments are delinquent to accessing only certain Internet sites, and/or doing so at a reduced quality of service. Thus, a transaction between the home agent and the AAA server to deploy a filter may not be required for all WCDs.

Accordingly, in a first embodiment, an AAA server is communicatively coupled to a foreign agent and a home agent. The AAA server may receive a first message from the foreign agent seeking to authenticate a WCD. In response to receiving the first message, the AAA server may determine that the WCD is subject to a filter. In response to determining that the WCD is subject to the filter, the AAA server may transmit a second message to the foreign agent. Preferably, the second message includes an attribute that contains a representation of the filter.

The AAA server may then receive a third message from the foreign agent. Preferably, the third message includes accounting information associated with the WCD, an address of the home agent, and the attribute that contains the representation of the filter, In response to receiving the third message, the AAA server may determine that the third message includes the attribute that contains the representation of the filter, and then transmit a fourth message to the home agent. Preferably, the fourth message contains the representation of the filter. The home agent may then apply the filter as needed to at least some of the WCD's communication.

In this way, the AAA server may transmit a message to the home agent for WCDs that are subject to filtering, and may refrain from transmitting a message to the home agent for WCDs that are not subject to filtering. Thus, resources in the AAA server and the home agent may be conserved.

Alternatively, the AAA server and the home agent may also be communicatively coupled to an authorization device. Preferably, the authorization device offloads, from the AAA server, the process of generating the fourth message. Thus, for example, the AAA server may determine that the third message includes an attribute that contains the representation of the filter, and then forward the third message to the authorization device. Then, the authorization device may create the fourth message from at least some information in the third message, and transmit the fourth message to the home agent on behalf of the AAA server.

The embodiments herein may involve standard AAA protocols such as RADIUS and DIAMETER, or other AAA protocols. Thus, for example, the first message may be a RADIUS access-request message, the second message may be a RADIUS access-accept message, the third message may be a RADIUS accounting-request message, and the fourth message may be a RADIUS change-of-authorization (COA) message. Additionally, these embodiments may operate with more than one WCD, more than one AAA server, more than one foreign agent, and more than one home agent.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIG. 2A is a call flow;

FIG. 2B is another call flow, in accordance with an exemplary embodiment;

FIG. 4 is a flow chart, in accordance with an exemplary embodiment.

DESCRIPTION

In accordance with exemplary embodiments, methods and systems for efficient deployment of communication filters are presented. Subsequent to a WCD using mobile IP to register with a home agent, an AAA server may provide a filter to the home agent. Then, the home agent may apply the filter to at least some of the WCD's communication that passes through the home agent.

I. System Architecture

Figure 1:
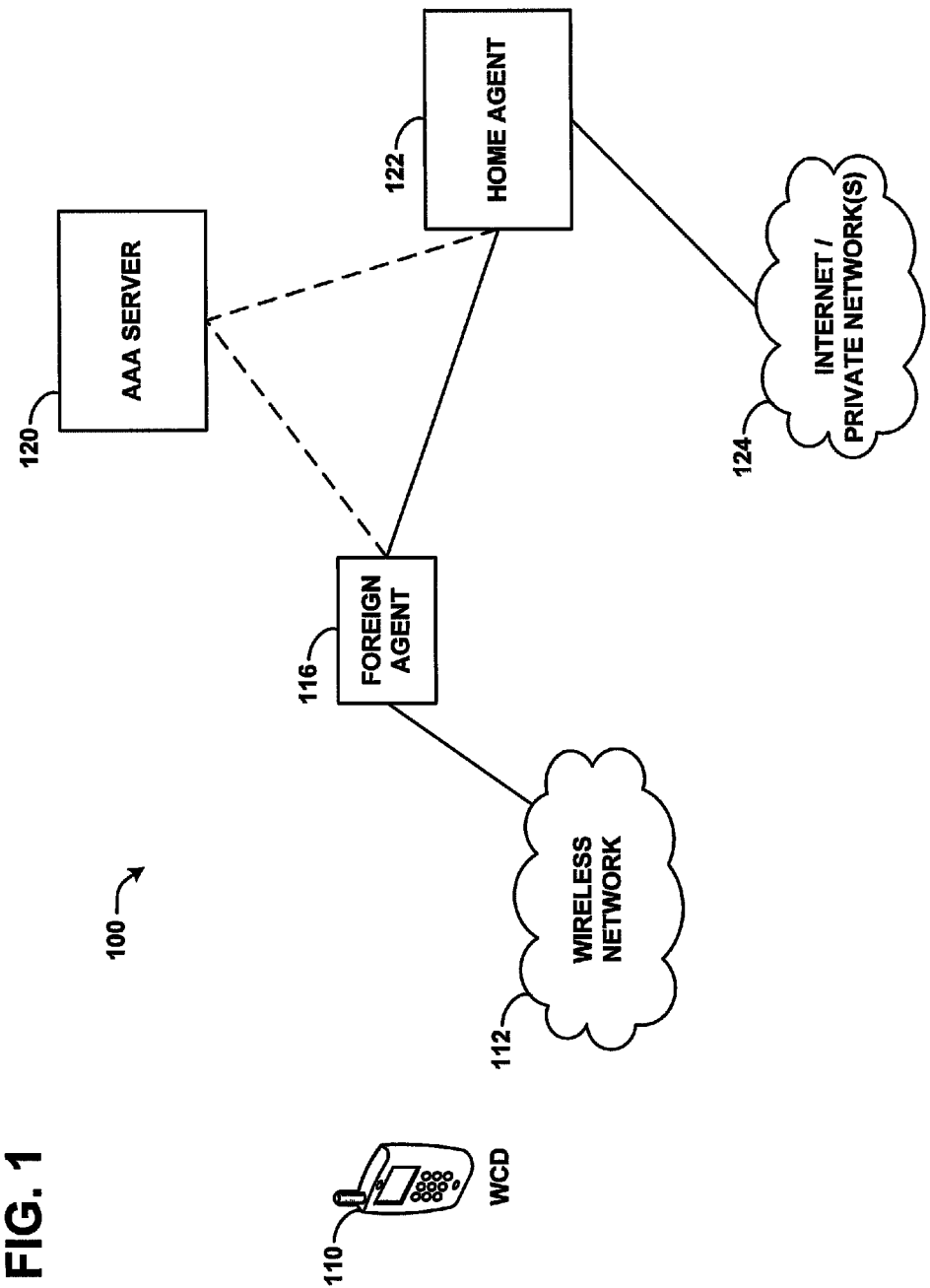
FIG. 1 depicts a wireless communication system, in accordance with an exemplary embodiment.

FIG. 1 is a simplified block diagram of an exemplary communication network 100, in which exemplary embodiments may be employed. WCD 110 may use wireless network 112 to access other networks, such as Internet and/or private network(s) 124, through the use of the mobile IP.

In particular, WCD 110 could be a wireless telephone, wireless personal digital assistant, wirelessly equipped laptop computer, wireless router, or another type of mobile or fixed wireless device. Preferably, WCD 110 is a subscriber device, which is manipulated by a human in order to establish circuit-based or packet-based voice and/or data calls into the RAN and core network. However, WCD 110 could also be an automated device without a human interface. Typically, a WCD is associated with one or more wireless coverage areas at a time, and uses these wireless coverage areas to communicate with correspondent nodes, such as web servers, gaming servers, voice over Internet Protocol (VoIP) signaling proxies, VoIP bearer gateways, and other WCDs. Furthermore, WCD 110 may also support transferring its ongoing communication sessions from one wireless coverage area to another in a handoff process.

WCD 110 may use mobile IP to facilitate smooth handoffs with minimal disruption to ongoing voice and/or data sessions. Normally, IP devices are assigned a home IP address (HOA) by the access network to which they attach for voice of data services. A WCD, such as a mobile phone, may change access networks from time to time during the duration of a communication session. Each time the WCD changes access networks, the WCD may be assigned a different HOA, compelling the WCD to re-initiate all of its ongoing communication sessions.

Thus, when registering for network access via exemplary communication network 100, WCD 110 may use mobile IP. As is described in Internet Request for Comments (RFC) 2002, "IP Mobility Support for IPv4," incorporated in its entirety by reference herein, mobile IP is a well known network protocol that allows a WCD to maintain a substantially static HOA as the WCD roams between access networks. In this way, the WCD can roam from access network to access network while maintaining its ongoing communication sessions. To utilize mobile IP, the WCD may register with a foreign agent that may be associated with the access network, as well as a home agent that may be independent of all access networks.

Foreign agent 116 may be a router-like device that manages the connectivity of WCDs to a packet-switched network. Examples of foreign agents include Code Division Multiple Access (CDMA) packet data serving nodes (PDSNs) and Worldwide Interoperability for Microwave Access (WIMAX®) access serving network gateways (ASN-GWs). In an example embodiment, foreign agent 116 may serve tens, hundreds or thousands of WCDs via point to point protocol (PPP) links to each WCD. However, a PPP link to a WCD is not required for foreign agent 116 to serve a WCD.

Thus, WCD 110 may transmit a mobile IP registration-request message to foreign agent 116. The mobile IP registration-request message may contain one or more attributes that identify WCD 110. A mobile IP attribute is preferably a string of bits or bytes contained in a mobile IP message that can be used to hold information. Such attributes may hold information such as, but not limited to, a network access identifier (NAI), an International Mobile Subscriber Identifier (IMSI), a mobile directory number (MDN), an electronic serial number (ESN), and/or a mobile equipment identifier (MEID). Based on one or more of these attributes, and possibly additional information, foreign agent 116, on its own or in conjunction with one or more AAA servers, may determine whether to permit WCD 110 to use exemplary communication network 100.

For example, foreign agents may use one of the well known network protocols RADIUS (see for example, Internet RFC 2865, "Remote Authentication Dial In Subscriber Service (RADIUS)," incorporated in its entirety herein by reference) and/or DIAMETER (see for example, Internet RFC 3588, "Diameter Base Protocol," incorporated in its entirety herein by reference), to communicate with AAA servers. Home agents may also use RADIUS and/or DIAMETER to communicate with AAA servers, and the RADIUS and DIAMETER protocols may be referred to as "AAA interfaces." In FIG. 1, AAA interfaces are represented by the dashed lines connecting each of foreign agent 116 and home agent 122 with AAA server 120.

Accordingly, foreign agent 116 may transmit a RADIUS access-request message to AAA server 120, requesting authentication of WCD 110. The RADIUS access-request message may contain representations of one or more of the attributes that identify WCD 110 from the mobile IP registration-request message that foreign agent 116 received from WCD 110. If AAA server 120 authenticates WCD 110, AAA server 120 may transmit a RADIUS access-accept message to foreign agent 116. However, if AAA server 120 fails to authenticate WCD 110, AAA server 120 may instead transmit a RADIUS access-reject message to foreign agent 116. In the latter, case, foreign agent 116 preferably denies WCD 110 access to exemplary communication network 100.

Once WCD 110 is authenticated, foreign agent 116 may perform mobile IP functions on behalf of WCD 110, allowing WCD to attempt to register with home agent 122. In particular, foreign agent 116 may forward the mobile IP registration-request message that it received from WCD 110 to home agent 122.

A home agent, such as home agent 122, is preferably an anchor point for WCDs that support mobile IP. While WCD 110 may change its point of attachment from one foreign agent to another as it roams between wireless coverage areas, WCD 110 preferably maintains a registration with the same home agent. Furthermore, in order to maintain a substantially static HOA, the WCD may receive an HOA assignment from the WCD's serving home agent. Advantageously, allowing the WCD to maintain a substantially static HOA at a home agent rather than at a foreign agent permits the WCD to maintain its communication sessions as the WCD is handed off between foreign agents.

Thus, in order to register WCD 110, home agent 116 may receive the mobile IP registration-request message from foreign agent 116, and respond with a mobile IP registration-reply message. Upon receipt of the mobile IP registration-reply message, foreign agent 116 may forward the mobile IP registration-reply message to WCD 110, thus completing mobile IP registration procedures. Once so registered, all communication between WCD 110 and Internet/private network(s) 124 may pass through foreign agent 116 and home agent 122.

In some situations, a home agent and a WCD's serving foreign agent may use a tunnel to transport the WCD's communications. This tunnel may be an IP in IP tunnel, a generic routing encapsulation (GRE) tunnel, an IP security (IPsec) tunnel, or some other form of tunnel. In FIG. 1, such a tunnel is represented by the solid line connecting foreign agent 116 to home agent 122.

A home agent may perform other functions in addition to mobile IP. For instance, a home agent may perform deep packet inspection, firewall, and/or quality of service functions. Furthermore, a home agent may perform virtual private network (VPN) functions on behalf of a WCD, supporting secure communication between the home agent and a third party VPN gateway, such as an enterprise gateway. A home agent may also authenticate WCDs, or, in conjunction with an AAA server, facilitate authentication of WCDs.

An AAA server, such as AAA server 120, is typically a device that maintains a profile for each WCD registered with an operator of exemplary communication network 100. However, AAA server 120 may maintain profiles for other WCDs as well. Such a profile may contain an indication of the identity of each WCD and the WCD's subscriber (e.g., user). For example, a profile for a given WCD may include the given WCD's NAI, MDN, IMSI, ESN, MEID, username, password, and/or any other information, either general or specific to the given WCD.

For instance, if a WCD is subject to filtering, the WCD's profile may contain a specification of a filter. In this way, a custom filter may be specified for and applied to each WCD subject to filtering. Alternatively, the WCD's profile might instead contain a reference to specification of a filter, where the filter resides at a different device (such as a home agent). In this case, WCDs may be placed into categories, where each category of WCD may be subject to a particular filter. The device applying the filters would then be provisioned with each particular filter. Of course, a WCD's profile may contain both filter specifications and references to specification of filters.

It should be understood that the contents of a WCD's profile may contain more or less information than is described here. Since the RADIUS and DIAMETER protocols are both extensible, virtually any type of information stored in an authentication server profile can be passed between AAA server 120 and other network devices.

Furthermore, AAA server 120 may also collect accounting information per WCD, typically from foreign agents and/or home agents. This accounting information may include the amount of data that the foreign agents and/or home agents have transferred on behalf of a WCD. Thus, this accounting information may incorporate the number of bytes transmitted in the forward direction to the WCD, the number of bytes received in the reverse direction from the WCD, the duration of the WCD's session with a wireless network, information about the wireless network's characteristics, and potentially other information as well.

AAA server 120 may be divided, either physically or logically, into multiple entities. A home AAA server may be co-located with one or more home agents, and may maintain full profiles associated with WCDs. A visited AAA server is typically co-located with one or more foreign agents, and may be used by foreign agents as a proxy or broker service to a home AAA server. It should be understood that not all networks require all of these types of AAA servers. Moreover, visited AAA server and home AAA server functions may be combined into the same physical device or devices, or separated into distinct software components or physical devices.

Although not shown in FIG. 1, exemplary network 100 may contain various additional components such as base transceiver stations (BTSs), radio network controllers (RNCs), mobile switching centers (MSCs), and IP Multimedia Subsystem (IMS) servers. These components may be physically or logically separate, or may be combined with one another in various configurations. Furthermore, these components may operate in conjunction with one another to provide wireless network access to WCD 110 and other WCDs.

For example, a BTS may radiate to define one or more wireless coverage areas. Each wireless coverage area may provide air interface access to one or more WCDs. The air interface may include forward links for transmitting information from the BTS to a WCD (in the forward direction) and reverse links for transmitting information from a WCD to a BTS (in the reverse direction). BTSs and WCDs may exchange signaling, voice, data, video, or other media through the forward and reverse links.

An RNC may control multiple BTSs by determining how each BTS manages the WCDs in the BTS's wireless coverage areas. For example, an RNC may instruct a BTS to assign wireless channels to a WCD, increase or decrease power to a WCD, or hand off a WCD to a different BTS. Voice and data traffic to and from each WCD may flow through an RNC. Preferably, the RNC routes circuit-switched communications to an MSC and packet-switched communications to a foreign agent, such as a PDSN, or a similar device.

An MSC may perform some of the functions of a Class 5 telephony switch, but with additional functionality to manage the mobility of the end-subscriber devices, such as WCDs. For example, an MSC may comprise, or have access to, a visitor location register (VLR) and a home location register (HLR), and may facilitate short message service (SMS) functions. In general, an MSC may be responsible for switching functions, media transport functions, and managing the communications between WCDs and the publically-switched telephone network (PSTN).

The IMS is an architecture for enabling Internet Protocol (IP) multimedia services for both wireline and wireless devices. Accordingly, the IMS is designed to logically separate access layers from services layers, so client devices can utilize various IMS services regardless of through what means the client device is attached to an IP network. Thus, for example, a WCD may be able to access the same voice over IP (VoIP) services from both a CDMA wireless wide area network as well as an 802.11 wireless local area network (WLAN). Similarly, the IMS may allow a user of a WCD to be able to make use of the same services from their Digital Subscriber Line (DSL) or cable modem access network.

IMS signaling and call control are largely standardized around the Session Initiation Protocol (SIP), while multimedia bearer traffic typically uses the Real Time Protocol (RTP). The IMS also leverages other protocols, such as the Session Description Protocol (SDP) and DIAMETER. These common protocols support applications including VoIP, push to talk (PTT), video over IP, gaming, audio and video streaming, and other multimedia services. Additionally, an IMS infrastructure may support instant messaging, presence, email and social networking applications.

In terms of physical hardware, each of the components of FIG. 1 may each include at least one processor, data storage in the form of memory, and program instructions stored in the data storage and executable by the at least one processor to carry out the functions described herein. Furthermore, these components may operate in accordance with various types of wireless protocols, such as CDMA, WIMAX®, Universal Mobile Telecommunications System (UMTS), Long Term Evolution (LTE®), IEEE 802.11 (WIFI®), or other protocols now known or later developed.

II. Exemplary Filter Specifications

As described above, a home agent may apply one or more filters to a WCD's communication. While the filters discussed herein may be applied by a home agent, filters in general may be applied by any device in a communication network. Generally speaking, a filter may be considered to be one or more rules. Each rule may contain (i) a packet specification, and (ii) an action to be performed upon packets that match the packet specification.

For instance, a packet specification may involve a description of a packet in terms of one or more fields in the packet's header. It should be understood that a packet, such as an IP packet, may contain a number of headers, each associated with a particular data link, network, or transport layer protocol. Thus, an IP packet may contain an Ethernet header, an IP header, and a Transport Control Protocol (TCP) or User Datagram Protocol (UDP) header. According, an IP packet specification appearing in a filter may refer to a source IP address, a destination IP address, a source TCP/UDP port, a destination TCP/UDP port, and other fields that may appear an IP packet's headers. Wildcards may be used to specify any of these fields. Alternatively or additionally, the packet specification may include a string of bytes that may appear in any part of the packet, including the packet's application layer payload.

Actions that may be associated with packet specification include, for example, directives to "allow," "deny," "redirect," "copy," or "modify" packets. An "allow" action may instruct the home agent to permit matching packets to pass through the home agent, while a "deny" rule may instructs the home agent to drop (delete) matching packets. A "redirect" rule may instruct the home agent to transmit matching packet to a destination other than the one encoded in the packet. A "copy" rule may instruct the home agent to transmit a matching packet to its prescribed destination, but to also make a copy of the packet and either store that copy or to transmit the copy to another destination. A "modify" rule may specify how the home agent should change matching packets before forwarding them towards their destinations.

TABLE 1

Example packet filters.

| Filter | Packet Specification | Action |
|---|---|---|
| 1 | ip.dest_addr = 192.168.12.34 | deny |
| 2 | (ip.src_addr = 192.168/16) & (tcp.src_port = 80) | allow |
| 3 | string = "credit card" | redirect to 10.17.153.61 |
| 4 | ip.src_addr = 192.168.1.57 | Modify ip.tos = 0x2e |

Table 1 provides example packet filters, in order to further illustrate their specification and use. Filter 1 instructs a home agent to deny all packets with a destination IP address of 192.168.12.34. Filter 2 instructs a home agent to allow all packets with a source IP address that falls within the block 192.168.0.0-192.168.255.255 and uses a TCP source port of 80. The specification of the source IP address range in filter 2 is an example of a wildcard use. (Filter 2 makes use of IP subnet nomenclature to specify a range of IP addresses—see Internet RFC 1878 "Variable Length Subnet Table For IPv4," incorporate in its entirety herein by reference.) Filter 3 instructs a home agent to redirect all packets containing the string "credit card" to the IP address 10.17.153.61. Filter 4 instructs the home agent to write the byte 0x2e to the IP type of service field (thus modifying the field) for packets with a source address of 192.168.1.57.

It should be understood that filters are not limited to the examples provided in Table 1. Filters specifications may be arbitrarily complex, and may include various logical operations involving a broad range of fields, strings, or values in packets. Furthermore, actions other than the four example actions listed above may be applied. Also, multiple rules may be applied to the same packet.

III. Exemplary Call Flows

FIG. 2A is an exemplary call flow 200 depicting a typical method for deploying a filter from an AAA server to a home agent. At step 210, WCD 110 may transmit a mobile IP registration-request message to foreign agent 116. At step 212, foreign agent 116 may transmit a RADIUS access-request message to AAA server 120, seeking to authenticate WCD 110. AAA server 120, which preferably contains or has access to a profile for WCD 110, may respond with a RADIUS access-accept message at step 214, to indicate that WCD 110 is authenticated.

At step 216, foreign agent 116 may forward the mobile IP registration-request message that it received in step 210 to home agent 122. Home agent 122 may then, at step 218, transmit a RADIUS access-request message to AAA server 120, At step 220, AAA server 120 may respond with a RADIUS access-accept message the contains a filter. Home agent may then, at step 222, transmit a mobile IP registration-reply message to foreign agent 116, and, at step 230, install the filter so that it can be applied to communications to or from WCD 110.

At step 224, foreign agent 116 may forward the mobile IP registration-reply message to WCD 110, at step 226, foreign agent 116 may transmit a RADIUS accounting-request message to AAA server 120, and at step 228, AAA server 120 may transmit a RADIUS accounting-response message to foreign agent 116. Although steps 224, 226, and 228 are not directly related to the installation of the filter at home agent 122, these steps are included in call flow 200 for purposes of completeness. After step 224, WCD 110 may transmit and receive voice and/or data communication with other endpoints communicatively attached to home agent 122, subject to the filter installed in home agent 122.

While the method depicted by call flow 200 may be used to deploy and install a filter at a home agent, this method has potential disadvantages. First, each WCD, such as WCD 110, is authenticated twice, once by the combination of a foreign agent and an AAA server (referred to as foreign agent authentication), then again by the combination of a home agent and the AAA server (referred to as home agent authentication). Second, the home agent communicates with the AAA in order to determine whether the WCD is subject to a filter. Thus, even if a very small percentage of WCDs are subject to filters, every WCD attempting to register with the home agent triggers an home agent authentication transaction. This may waste home agent and AAA resources.

FIG. 2B is an exemplary call flow 250, depicting an improved method of deploying a filter from an AAA server to a home agent. The first four steps of call flow 250 are similar to the first four steps of call flow 200. At step 260, WCD 110 may transmit a mobile IP registration-request message to foreign agent 116. At step 262, foreign agent 116 may transmit a RADIUS access-request message to AAA server 120, seeking to authenticate WCD 110. AAA server 120, may respond with a RADIUS access-accept message at step 264, to indicate that WCD 110 is authenticated.

Preferably, the RADIUS access-accept message includes a RADIUS class attribute, and this class attribute contains a filter for home agent 122 to apply to at least some of the communications of WCD 110. As is described in RFC 2865, the class attribute may be transmitted from an AAA server to an AAA client (e.g., foreign agent 116) in a RADIUS access-accept message. The class attribute may be a string of bytes that may have a user-defined or site-specific meaning. Thus, the class attribute is an example of a "container" attribute that can be used to transport various types of information, such as a filter. Furthermore, an AAA client that receives a filter attribute in a RADIUS access-accept message typically includes the class attribute in any RADIUS accounting messages that the AAA client transmits to the AAA server. Preferably, AAA server 120 only includes a class attribute containing a filter in the RADIUS access-accept message if WCD 110 is subject to a filter.

Returning to call flow 250, at step 266, foreign agent 116 may forward the mobile IP registration-request message that it received in step 260 to home agent 122. However, instead of performing HA authentication at step 268, home agent 122 transmits a mobile IP registration-reply message to foreign agent 116. Then, at step 270, foreign agent 116 may forward the mobile IP registration-reply message to WCD 110. After step 270, WCD 110 may transit and receive voice and/or data communication with other endpoints communicatively attached to home agent 122.

Furthermore, at step 272, according to normal RADIUS procedures, foreign agent 116 transmits a RADIUS accounting-request message that includes the class attribute containing the filter to AAA server 120. This RADIUS accounting-request message may include accounting information associated with the WCD, an address of a home agent with which the WCD has registered, and a copy of the class attribute that contains the filter.

At step 274, in response to receiving the RADIUS accounting request message, AAA server 120 may transmit a RADIUS accounting-response message to foreign agent 116. At this point, AAA server 120 may be aware that WCD 110 has been authenticated, and that WCD 110 is subject to a filter. Thus, at step 276, AAA server 120 may transmit a RADIUS COA message to home agent 122. At step 278, home agent 122 may transmit a RADIUS COA-ACK message to AAA server 120, in order to acknowledge receipt of the RADIUS COA message.

The RADIUS COA and COA-ACK messages are defined in Internet RFC 3576, "Dynamic Authorization Extensions to Remote Authentication Dial In User Service (RADIUS)," incorporated in its entirety herein by reference. These messages may be used by an AAA server to change parameters associated with an ongoing communication session at a device in the bearer plane of the session. Preferably, the RADIUS COA message that AAA server 120 transmits at step 274 includes the filter that the AAA server received at step 272, as well as an identifier of WCD 110. At step 280, home agent 122 may install the filter so that home agent 122 can apply the filter to the communication of WCD 110. In this way, filters may be installed in home agent 122 without performing home agent authentication for each mobile IP registration at home agent 122, and there may be a home agent transaction with the AAA only if the WCD being registered is subject to a filter.

It should be understood that call flows 200 and 250 are merely for purposes of example, and should not be viewed at limiting. Accordingly, other call flows containing more or fewer steps, using different messages and/or protocols, or taking place between different components are also within the scope of the embodiments herein. In particular, a number of mobile IP and RADIUS message types were used to describe these embodiments. However, protocols other than mobile IP and RADIUS, as well as messages with different names and different functions, may be used instead of the protocols and messages discussed above.

IV. Exemplary AAA Server Configuration

Figure 3A:
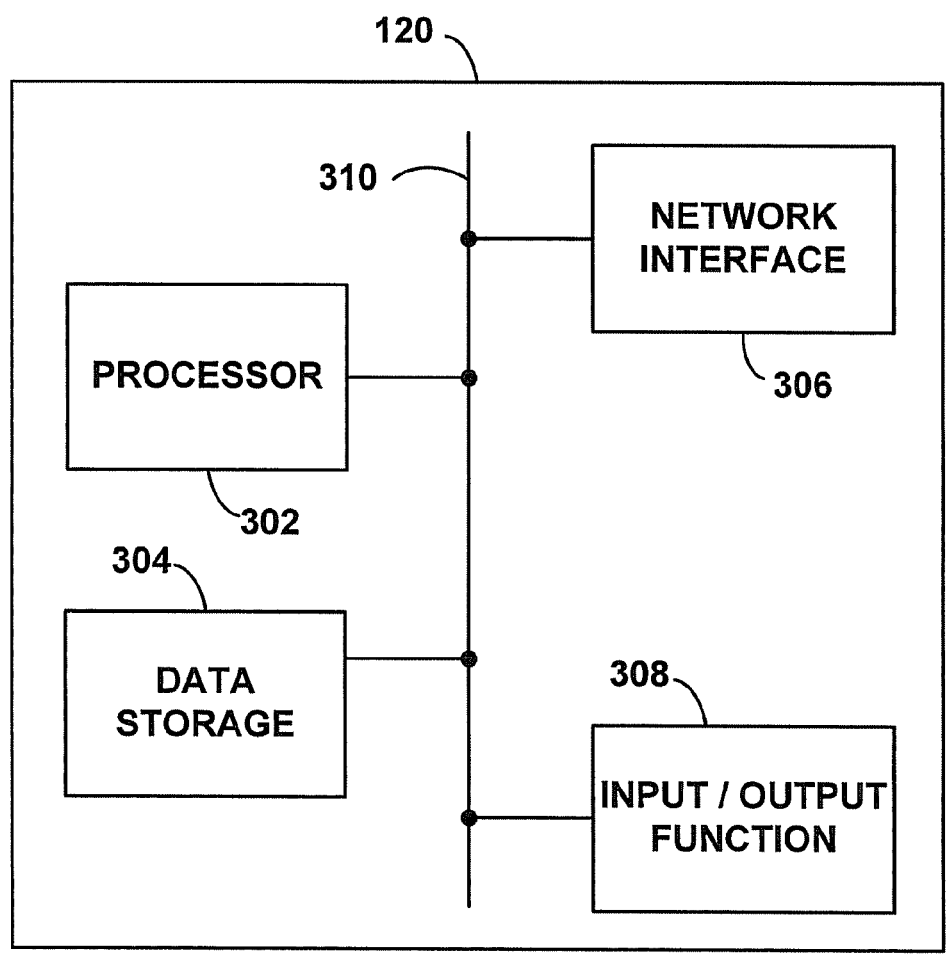
FIG. 3A is a block diagram of an AAA server in accordance with an exemplary embodiment.

FIG. 3A is a simplified block diagram depicting an exemplary representation of AAA server 120. FIG. 3A illustrates some of the functional components that would likely be found in an AAA server arranged to operate in accordance with the embodiments herein. AAA server 120 preferably includes a processor 302, a data storage 304, a network interface 306, and an input/output function 308, all of which may be coupled by a system bus 310 or a similar mechanism.

Processor 302 preferably includes one or more CPUs, such as one or more general purpose processors and/or one or more dedicated processors (e.g., application specific integrated circuits (ASICs) or digital signal processors (DSPs), etc.) Data storage 304, in turn, may comprise volatile and/or non-volatile memory and can be integrated in whole or in part with processor 302. Data storage 304 preferably holds program instructions executable by processor 302, and data that is manipulated by these instructions, to carry out various functions described herein. Alternatively, the functions can be defined by hardware, firmware, and/or any combination of hardware, firmware and software.

Network interface 306 may take the form of a wireline connection, such as an Ethernet, Token Ring, SONET, or T-carrier connection. Network interface 306 may also take the form of a wireless connection, such as IEEE 802.11, BLUETOOTH®, CDMA, WIMAX®, UMTS®, LTE®, or any other interface used to communicate with client nodes. However, other forms of physical layer connections and other types of standard or proprietary communication protocols may be used over network interface 306. Furthermore, network interface 306 may comprise multiple physical or logical network interfaces, each capable of operating according to the same or different protocols.

Input/output function 308 facilitates user interaction with AAA server 120. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, AAA server 120 may support remote access from another device, via network interface 306 or via another interface (not shown), such an RS-232 port.

By way of example, the data in data storage 304 may contain information associated with performing any of the methods, processes, or functions described herein or represented by any of the accompanying figures. For example, data storage 304 may contain profiles associated with one or more WCDs. Each profile may include various types of WCD identifiers, as well as specifications of one or more filters, or references to one or more filters, to be applied to the WCD's communication. Data storage 304 may also contain program instructions that are executable by processor 302 to perform any of the methods, processes, or functions presented herein or represented by any of the accompanying figures.

Figure 3B:
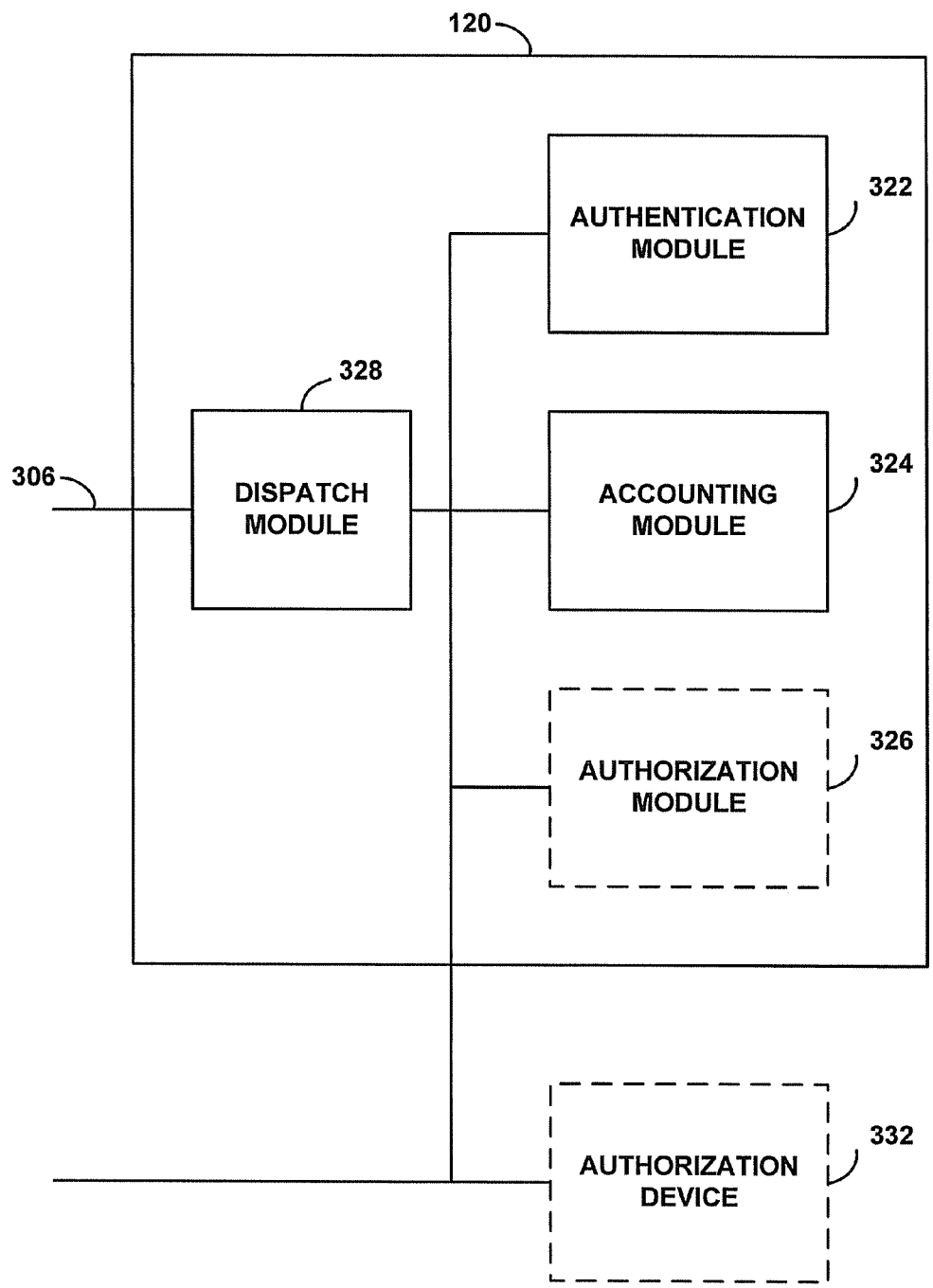
FIG. 3B depicts a logical representation of an AAA server, in accordance with an exemplary embodiment.

While FIG. 3A is directed to the physical components of AAA server 120, FIG. 3B is directed to logical functions of AAA server 120 that may be carried out by these physical components. In particular, AAA server 120 may comprise an authentication module 322, an accounting module 324, and an authorization module 326, all communicative or logically coupled to a dispatch module 328.

The messages transmitted and received by AAA server 120 may be divided into three categories: (i) authentication messages, such as RADIUS access-request, RADIUS access-accept, and RADIUS access-reject messages, (ii) accounting messages, such as RADIUS accounting-request and RADIUS accounting-response messages, and (iii) authorization messages, such as RADIUS COA messages and RADIUS COA-ACK messages. Thus, AAA server 120 may be arranged such that authentication module 322 transmits and receives authentication messages, accounting module 324 transmits and receives accounting messages, and authorization module 326 transmits and receives authorization messages. Accordingly, these modules may reside on the same or separate hardware components.

Preferably, dispatch module 328 routes each type of incoming message from interface 306 to the appropriate module. Thus, dispatch module 328 may route authentication messages to authentication module 322, accounting messages to accounting module 324, and authorization messages to authorization module 326. Dispatch module 328 may accomplish these functions in a number of ways. For instance, dispatch module 328 may examine the (i) application layer RADIUS message type, (ii) the TCP or UDP destination port number of incoming RADIUS messages, or (iii) the destination IP address of incoming RADIUS messages in order to determine which module to route these messages. Of course, dispatch module 328 may make these routing determinations in other ways as well.

In some situations, there may be a benefit to offloading one or more of the AAA server functions of authentication, accounting, and authorization. For example, in an alternate embodiment, the authorization function of AAA server 120 may be offloaded to authorization device 332. (Authorization module 326 and authorization device 332 are depicted with dashed lines to indicate that authorization functions may be performed by one, the other, or both, of these components.) Authorization device 332 may be separate from AAA server 120, either physically or logically. Thus, authorization device 332 may be a standalone server that is communicatively coupled to AAA server 120, or may be a software module that operates on at least some of the same physical hardware as AAA server 120.

Regardless of the exact configuration of authorization device 332, AAA server 120 preferably transmits least some of the information contained in a RADIUS accounting-request message to authorization device 332. Preferably, AAA server 120 transmits the RADIUS accounting-request message, or a portion of the information in it, to authorization device 332 only if the RADIUS accounting-request message includes a class attribute containing a filter.

Thus, for example, accounting module 324 of AAA server 120 may receive an RADIUS accounting-request message. Accounting module 324 may determine that the RADIUS accounting-request message includes a class attribute containing a filter, and then transmit the RADIUS accounting-request message (or a portion thereof including the filter) to authorization device 332. Upon receiving this message from AAA server 120, authorization device 332 may generate a RADIUS COA message from at least a portion of the message. Then, authorization device 332 may transmit this RADIUS COA message to home agent 122. In this way, the computational burden of parsing information from an RADIUS accounting-request message, forming a RADIUS COA message, and transmitting the RADIUS COA message to a home agent is offloaded from AAA server 120.

V. Exemplary AAA Server Procedures

FIG. 4 is a flow chart depicting procedures that may occur at an AAA server, such as AAA server 120, in accordance with exemplary embodiments. At step 410, the AAA server may receive a first message, such as a RADIUS access-request message, from a foreign agent. This first message may be seeking to authenticate a WCD for mobile IP access to the foreign agent and a home agent. At step 415, during the authentication process, the AAA server may determine that the WCD is subject to a filter. The filter may be intended to be applied by the home agent. Accordingly, at step 420, the AAA server may transmit a second message, such as a RADIUS access-accept message, to the foreign agent. This second message may include an attribute that contains the filter.

At step 425, the AAA server may receive a third message, such as a RADIUS accounting-request message, from the foreign agent. This third message may include accounting information associated with the WCD, an address of a home agent with which the WCD has registered, and a copy of the attribute that contains the filter. At step 430, the AAA server determines whether an authorization device, such as authorization device 332, is present. If such an authorization device is present, then the AAA server may transmit a fourth message, including at least a representation of the filter, to the authorization device. The authorization device may then generate a fifth message, such as a RADIUS COA message, from the fourth message and then transmit this fifth message to the home agent. Alternatively, the AAA server may generate the fourth message from information received in the third message and transmit this fourth message, in the form of a RADIUS COA message, to the home agent. Regardless its destination, this fourth message may include at least a representation of the filter. Whether the home agent receives the filter directly from the AAA server or via other device, such as an authorization device, the home agent may install the filter so that the WCD's communication is subject to the filter.

It should be understood that flow chart 400 is merely for purposes of example, and should not be viewed at limiting. Accordingly, methods, containing more or fewer steps, containing different steps, and taking place between different components, are also within the scope of the embodiments herein.

VI. Conclusion

Exemplary embodiments have been described above. Those skilled in the art will understand, however, that changes and modifications may be made to these embodiments without departing from the true scope and spirit of the invention, which is defined by the claims.

What is claimed is:

1. A method comprising:
a server receiving a first message from a first foreign agent, wherein via the first message the first foreign agent seeks to authenticate a first wireless communication device (WCD);
responsive to receiving the first message, the server determining that the first WCD is to be subject to, at a home agent, a first filter, wherein the first filter represents rules for the home agent to apply data packets of to the first WCD's communication;

responsive to determining that the first WCD is to be subject to, at the home agent, the first filter, the server transmitting a second message to the first foreign agent, wherein the second message includes an attribute that contains a representation of the first filter;

the server receiving a third message from the first foreign agent, wherein the third message includes (i) accounting information associated with the first WCD, (ii) an address of the home agent, and (iii) the attribute that contains the representation of the first filter; and responsive to receiving the third message, the server transmitting a fourth message to the home agent, wherein the fourth message contains the representation of the first filter and requests the home agent to apply the first filter to at least some communications associated with the first WCD, such that the home agent does not perform home agent authentication for the first WCD.

2. The method of claim 1, wherein the representation of the first filter is a reference to a specification of the first filter stored on the home agent.

3. The method of claim 1, wherein the representation of the first filter is a specification of the first filter, and wherein the specification contains rules associated with the WCD.

4. The method of claim 1, wherein the first message is an access-request message, wherein the second message is an access-accept message, and wherein the third message is an accounting-request message.

5. The method of claim 1, wherein the server comprises an authentication module and an accounting module, wherein the authentication module receives the first message and transmits the second message, and wherein the accounting module receives the third message.

6. The method of claim 1, wherein the server has access to a database of profiles, each profile in the database associated with a WCD, and wherein the server determining that the first WCD is subject to the first filter comprises:

the server looking up the first WCD in the database of profiles; and the server finding an entry for the first WCD in the database of profiles, wherein the entry contains the representation of the first filter.

7. The method of claim 1, further comprising:

the server receiving a fifth message from the first foreign agent, wherein via the fifth message the first foreign agent seeks to authenticate a second WCD;

responsive to receiving the fifth message, the server determining that the second WCD is subject a second filter;

responsive to determining that the second WCD is subject to the second filter, the server transmitting a sixth message to the first foreign agent, wherein the sixth message includes an attribute that contains a representation of the second filter;

the server receiving a seventh message from the first foreign agent, wherein the seventh message includes (i) accounting information associated with the second WCD, (ii) the address of the home agent, and (iii) an attribute that contains the representation of the second filter; and responsive to receiving the seventh message, the server transmitting an eighth message to the destination, wherein the eighth message contains the representation of the second filter.

8. The method of claim 1, further comprising:

the server receiving a fifth message from the home agent, wherein the fifth message acknowledges that the home agent has installed the first filter so that the first filter is applied to at least some communications associated with the first WCD.

9. The method of claim 1, wherein the attribute is a class attribute.

10. The method of claim 1, wherein the server is also communicatively coupled to a second foreign agent, the method further comprising:

after transmitting the fourth message the server receiving a fifth message from the second foreign agent, wherein via the fifth message the second foreign agent seeks to authenticate a second WCD;

responsive to receiving the fifth message, the server determining that the second WCD is subject the second filter, wherein the second filter represents rules for the home agent to apply to the second WCD's communication;

responsive to determining that the second WCD is subject to the second filter, the server transmitting a sixth message to the second foreign agent, wherein the sixth message includes an attribute that contains a representation of the second filter;

the server receiving a seventh message from the second foreign agent, wherein the seventh message includes (i) accounting information associated with the second WCD, (ii) the address of the home agent, and (iii) the attribute that contains the representation of the second filter; and responsive to receiving the seventh message, the server transmitting an eighth message to the destination, wherein the eighth message contains the representation of the second filter.

11. A server comprising:

a processor;

a data storage containing a profile associated with a wireless communication device (WCD), wherein the profile indicates that the WCD is to be subject to, at a home agent, a filter, wherein the filter represents rules for the home agent to apply to data packets of the WCD's communication;

program instructions, stored in the data storage and executable by the processor, to (i) receive a first message from a foreign agent, wherein via the first message the foreign agent seeks to authenticate the WCD, (ii) responsive to receiving the first message, determine that the WCD is to be subject to, at the home agent, the filter, (iii) responsive to determining that the WCD is to be subject to, at the home agent, the filter at the home agent, transmit a second message to the foreign agent, wherein the second message includes an attribute that contains a representation of the filter, (iv) receive a third message from the foreign agent, wherein the third message contains (a) accounting information associated with the WCD, (b) an address of the home agent, and (c) the attribute that contains the representation of the filter, and (v) responsive to receiving the third message, transmit a fourth message to the home agent, wherein the fourth message contains the representation of first filter and requests the home agent to apply the filter to at least some communications associated with the WCD, such that the home agent does not perform home agent authentication for the first WCD.

12. The server of claim 11, wherein the profile includes a reference to a specification of the filter stored on the home agent.

13. The server of claim 11, wherein the profile includes a specification of the filter, wherein the specification contains rules associated with the WCD.

14. The server of claim 11, wherein the profile is stored in a database of profiles, and wherein the program instructions to determine that the WCD is subject to the filter comprise:
   program instructions, stored in the data storage and executable by the processor, to look up the WCD in the database of profiles, and find an entry for the WCD in the database of profiles, wherein the entry contains the representation of the filter.

* * * * *